March 27, 1934.  R. D. EVANS  1,952,427
SEALING RING
Filed July 15, 1932   2 Sheets-Sheet 1

Inventor
Rhys D Evans
Attorney

March 27, 1934. R. D. EVANS 1,952,427
SEALING RING
Filed July 15, 1932 2 Sheets-Sheet 2

Inventor
Rhys D. Evans

By

Attorney

Patented Mar. 27, 1934

1,952,427

UNITED STATES PATENT OFFICE 1,952,427

SEALING RING

Rhys D. Evans, Akron, Ohio, assignor to Wingfoot Corporation, Wilmington, Del., a corporation of Delaware Application July 15, 1932, Serial No. 622,609

8 Claims. (Cl. 18—45)

This invention relates to improvements in sealing rings and the like, more particularly adapted to seal the space between the beads of a tire and to assist in properly shaping the beads during vulcanization of the tire.

In the vulcanization of a pneumatic tire, especially where the fluid pressure needed to maintain the tire in contact with the vulcanizing mold is admitted directly into the tire without the aid of a container such as an airbag or the like, it usually is customary to seal the space between the beads whereby a suitable pressure may be maintained in the tire and escape of the pressure fluid prevented. Metal sealing rings have been proposed for this purpose and under some conditions may be reliably used, but ordinarily great difficulty is encountered in placing a metal ring in its proper position due to the non-flexing characteristic of the metal. For this reason it is desirable to use a sealing ring formed of rubber or other suitable flexible material. However, in using a rubber sealing ring it has been found that shrinkage or transverse distortion occurs, particularly in the sidewalls of the ring and unless some means is provided to resist this shrinkage, the useful life of the ring is relatively short.

It is an object of this invention to provide a sealing ring of the character referred to having means to resist the shrinkage or transverse distortion of the ring.

Another object is to provide a sealing ring having a plurality of helical or coil springs embedded transversely in the body of the ring whereby these springs will resist transverse distortion of the ring.

A further object is to provide an abutment at each end of each spring to assist in maintaining the springs in proper position and to increase the area over which the action of the springs will be effective.

The foregoing and other objects and advantages will become apparent from the following description in connection with the accompanying drawings, wherein I have shown one embodiment of the invention. In this showing:

Figure 1:
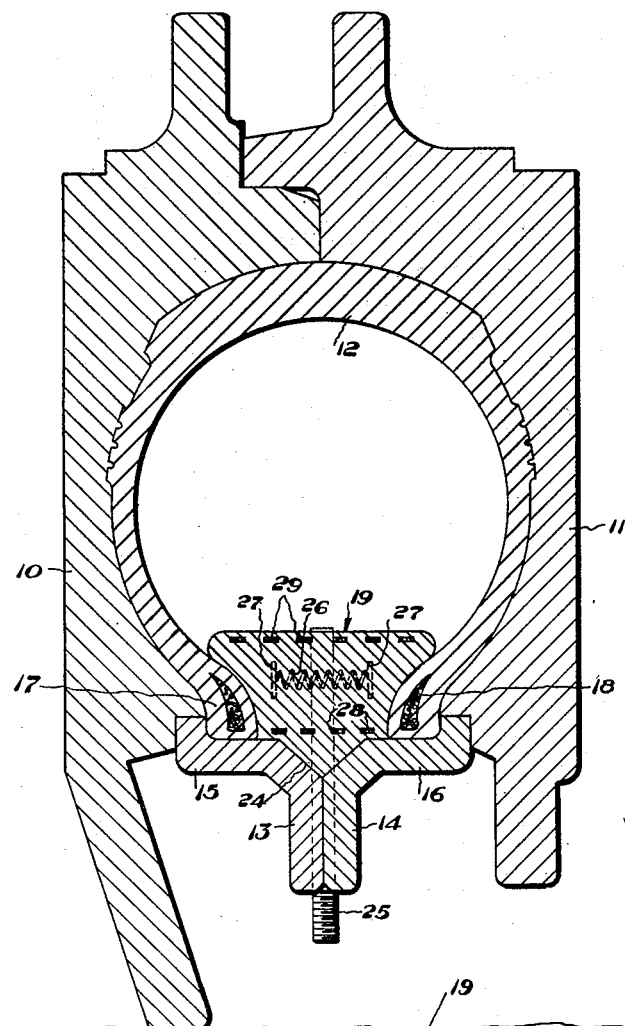
Fig. 1 is a transverse, sectional view through a portion of a mold having a tire and sealing ring therein.
Figure 2:
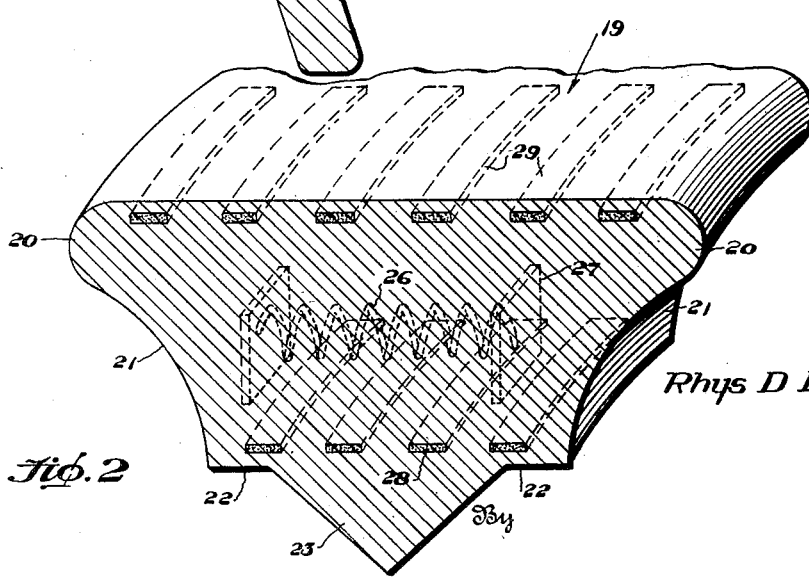
Fig. 2 is a partial perspective view of the sealing ring, on a larger scale.

Referring to the drawings the numerals 10 and 11 indicate respectively, a pair of mold sections of conventional construction adapted for use in the vulcanization of pneumatic tires. These sections may be secured together in the usual or any suitable manner (not shown) and each section contains a cavity arranged whereby a pneumatic tire 12 of the usual construction can be received therein, as will be understood. A pair of mold rings 13 and 14, which may be formed integral with the respective mold sections, or which may be separate therefrom and suitably assembled in the mold structure, are provided with flanges 15 and 16 respectively, against which rest the inner portions of the tire beads 17 and 18. The flanges 15 and 16 have outwardly projecting portions which extend around the heels of the beads in the usual manner.

The sealing ring provided by this invention is indicated as a whole by the numeral 19, and is adapted to be arranged between the beads of the tire substantially as indicated in Fig. 1. This sealing ring is formed of rubber or other material of similar properties which is so compounded as to permit of continuous use over a long period of time without serious injury from the successive heating endured in use by the ring. Any of the methods, well known to those skilled in the art, may be used for compounding the ring in the manner explained.

In the present instance the outer portion of the ring is its widest portion, being rounded as at 20 to provide a wing on each side thereof. Inwardly of the portions 20, each side of the ring is curved as at 21 to receive the beads of the tire. After the latter is cured, the curves of the beads will correspond to these curves 21. The inner periphery of the sealing ring is formed with surfaces 22 which rest upon the flanges 15 and 16 of the mold rings and the inner central portion 23 tapers substantially to a point when viewed in transverse cross-section. This portion 23 rests snugly in a groove 24 formed in the mold rings 13 and 14 by beveling the sides of the latter as shown in Fig. 1. A suitable hollow stem 25 is embedded in the sealing ring in the usual manner whereby fluid under pressure can be admitted to the interior of the tire. The stem extends through suitable openings in the mold ring to be connected to a source of pressure through valve control means (not shown). The form of the sealing ring may vary according to the type of mold and tire with which it is to be used and I do not limit myself to the precise form illustrated and described.

A sealing ring of the character described may be effectively used during the curing of a few tires, but it has been found that shrinkage or transverse distortion occurs particularly in the sidewalls of the ring. In some instances this shrinkage begins after the ring has been used but once and while the precise reasons for the shrinkage are not fully understood, repeated tests have proven this to be the case. Obviously, this shrinkage reduces the size of the sealing ring, causing it to lose its effectiveness as a seal. Therefore, in order to increase the useful life of the sealing ring it becomes desirable to resist this transverse distortion. If a plurality of spaced flexible members, such as the helical or coil springs 26, are embedded in the sealing ring in substantially the position shown, they will resist distortion in the sidewalls and materially increase the useful life of the ring. These springs may be held under compression whereby they will be exerting a pressure tending to maintain the sidewall rubber in its original position, or they may be arranged normally free of compression whereby if they are compressed subsequently by inward movement of the sidewall rubber, they will have a tendency to return the rubber to its original position.

Whether or not the springs are initially arranged under compression, I prefer to utilize an abutment 27 at each end of each spring to increase the area over which the action of the spring will be effective and to assist in maintaining the springs in proper position. The abutments preferably are arranged substantially perpendicular to the axis of the ring. These abutments preferably have an area somewhat greater than the transverse cross-sectional area of one of the springs and may be formed of metal, such as steel or aluminum, or a heavy fabric such as canvas or duck. Preferably, but not necessarily, the abutments are suitably attached to the ends of the springs. Also, I prefer to reinforce the sealing ring by embedding a plurality of annular bands 28 adjacent the inner periphery and a plurality of similar bands 29 adjacent the outer periphery of the sealing ring. The bands 28 and 29 in this instance are formed of a plurality of wires similar to the conventional bead wires, but may be formed of other suitable material. Moreover, the use of these reinforcing bands is not essential and may be dispensed with if desired.

In building my sealing ring, I use a pair of complementary, annular forming rings 30 and 31, connected together as at 32, each member being formed with a complementary recess 33 to provide a cavity of a size and shape to permit the sealing ring to be built and partially formed therein. The forming members may be mounted for rotation in any suitable manner (not shown), and they may be of a collapsible construction, if desired.

Figure 3:
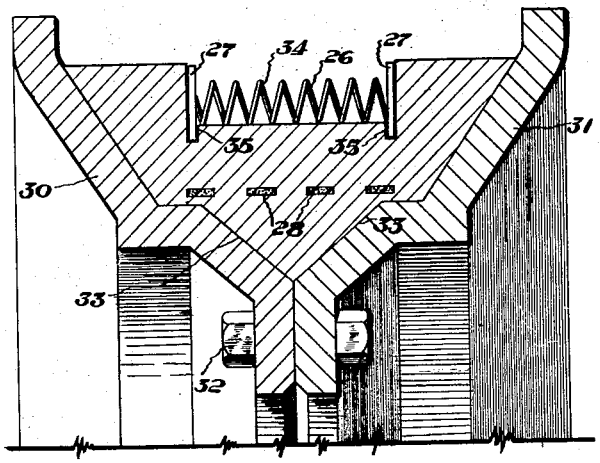
Figs. 3 and 4 are partial sectional views illustrating one method by which the sealing ring is built.

Referring to Fig. 3, the sealing ring is first partially built up to the point where the springs are to be inserted. In building the ring, it will be found convenient to use the compounded rubber in strip form, wrapping the strips around the building form until the ring is built up to the point where the reinforcing bands 28 are to be inserted, if the latter are to be used. These bands may be separately wrapped around the rubber and secured in position, or a single length of the wires may be wrapped a plurality of times and secured in any suitable manner, as will be understood. Wrapping of the rubber strips then is continued until the ring reaches substantially the condition shown in Fig. 3. In this condition, a relatively large central channel 34 is formed in the ring of a size sufficient to receive the springs 26 and abutments 27 and the channel is deepened at its sides, as indicated at 35, to receive the inner portions of the abutments whereby the inner portions of the springs will lie substantially flush with the rubber. If it is desired to place the springs under compression initially, the width of the channel may be varied accordingly, as will be understood. The rubber is, of course, uncured at this stage of the operation and is sufficiently plastic to permit it to be pressed down and compacted to fill the lower portion of the building form cavity and to permit the formation of the channel 34. If desired, a conventional stitching or pressing tool may be used to facilitate compacting of the rubber.

Figure 4:
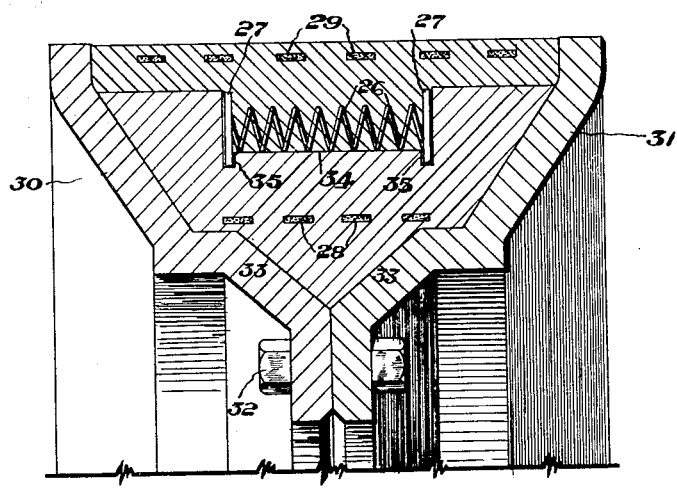

The sealing ring is completed by wrapping the rubber strips around the springs until the ring reaches substantially the condition shown in Fig. 4. In compacting the rubber it is forced between and around the coils of the springs and after cure the latter will be thoroughly embedded in the ring. Of course, wrapping of the rubber strips is temporarily halted at the point where the reinforcing bands 29 are inserted, if the latter are used, but is continued when the bands are in place. These bands may be wrapped in the same manner in which the bands 28 were wrapped. It will be understood, of course, that provision is made for the inclusion of the hollow stem 25 in any conventional manner.

Figure 5:
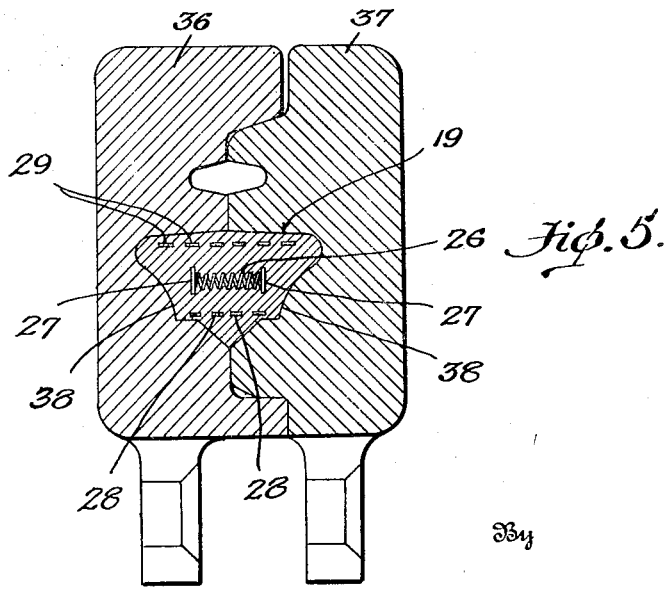
Fig. 5 is a partial sectional view of a mold in which the sealing ring is cured.

In Fig. 5 I have shown a pair of mold rings 36 and 37 provided with complementary cavities 38 of the size and shape desired in the finished ring. Any suitable means (not shown) may be used for securing these rings together. The sealing ring is removed from the forming members, by collapsing the latter if they are of collapsible construction, or by separating the members, and is transferred to the mold rings 36 and 37 in which it is cured in the customary manner.

It is believed to be obvious that I have provided an improved sealing ring which may be used many times without serious shrinkage.

Although I have illustrated one form of the sealing ring, it will be apparent to those skilled in the art that the invention is not limited to such form, but that various modifications may be made without departing from the spirit of the invention or the scope of the subjoined claims.

What I claim is:

1. A sealing ring of rubber or other material of similar properties having a plurality of coil springs integrally embedded transversely therein to resist transverse distortion of the ring.

2. A sealing ring of rubber or other material of similar properties having a plurality of coil springs integrally embedded transversely therein under compression to resist transverse distortion of the ring.

3. A sealing ring of rubber or other material of similar properties having a plurality of coil springs integrally embedded transversely therein to resist transverse distortion of the ring, and an embedded abutment arranged adjacent each end of each spring.

4. A sealing ring of rubber or other material of similar properties having a plurality of coil springs integrally embedded transversely therein under compression to resist transverse distortion of the ring, and an embedded abutment arranged adjacent each end of each spring.

5. A sealing ring of the character described in claim 3 in which the abutments are attached to the ends of the springs.

6. A sealing ring of the character described in claim 4 in which the abutments are secured to the ends of the springs.

7. A sealing ring of the class described comprising an endless annular body of resilient rubber or other material of similar properties, and a plurality of coiled compression springs transversely disposed and completely embedded in said body at circumferentially spaced points.

8. A sealing ring of the class described comprising an endless annular body of resilient rubber or other material of similar properties, and a plurality of coiled compression springs transversely disposed and completely embedded in said body at circumferentially spaced points, and reinforcing means for preventing circumferential expansion of the ring.

RHYS D. EVANS.